Dec. 9, 1941.      B. DEMAREST      2,265,357

APPARATUS FOR MEASURING THE CONCENTRATION OF VITAMIN A

Filed July 18, 1940

INVENTOR
Beaumont Demarest
BY
Angelo M. Pisarra
ATTORNEY

Patented Dec. 9, 1941

2,265,357

UNITED STATES PATENT OFFICE 2,265,357

APPARATUS FOR MEASURING THE CONCENTRATION OF VITAMIN A

Beaumont Demarest, Englewood, N. J., assignor to National Oil Products Company, Harrison, N. J., a corporation of New Jersey Application July 18, 1940, Serial No. 346,097

4 Claims. (Cl. 250—43)

This invention relates to measuring apparatus and in one of its more specific aspects it is directed to an improved apparatus for measuring the concentration of vitamin A.

The apparatus embodying my invention has, among others, the following characteristics. When compared with spectrophotometers used for measuring the concentration of vitamin A, the apparatus embodying my invention will be found to be less expensive to produce, more convenient and easier to operate, eliminates bias of the observer or operator and time saving. In addition, when compared with any photoelectric vitamin A apparatus known, the apparatus embodying the invention will be found superior in precision. These as well as other advantages of the invention will be readily apparent from the following description and drawing, wherein:

Figure 1:
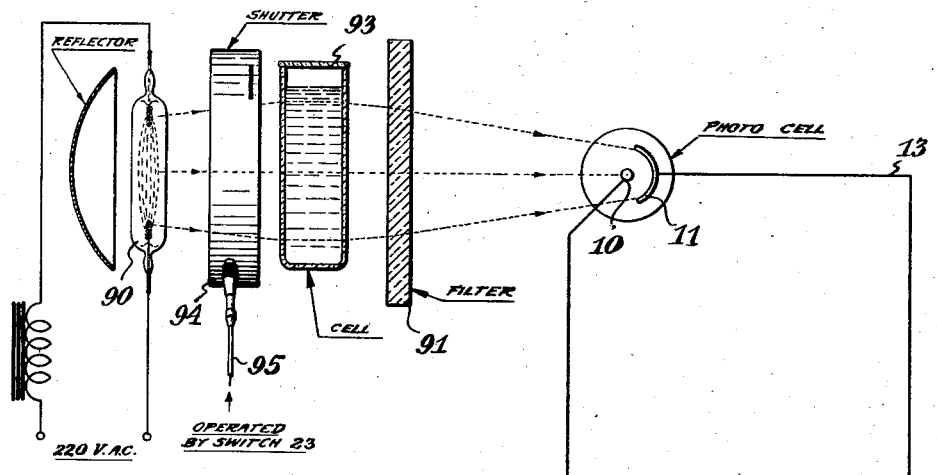
Figure 1 represents a diagrammatic sketch of the apparatus embodying my invention.
Figure 1:
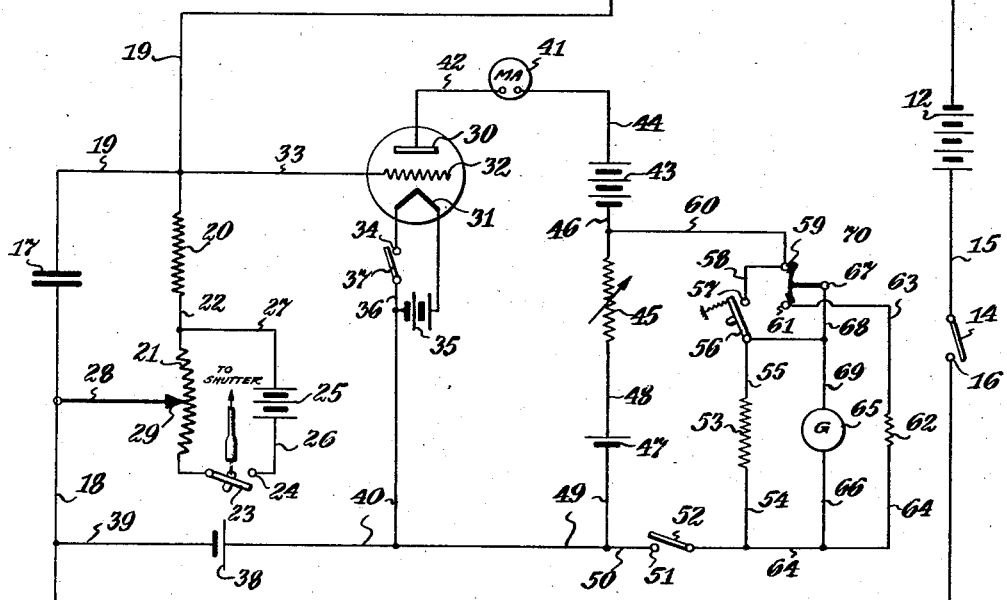
Figure 2:
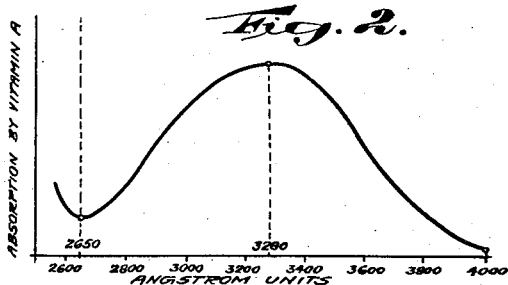
Figure 2 is a curve showing the absorption characteristics of vitamin A for various radiation between 2600 and 4000 Angstrom units.

As shown in the drawing, the invention comprises a photoelectric cell having an anode 10 and a cathode 11 composed of a photosensitive material, such as sodium, which is non-responsive to visible light of wave lengths above about 5000 Angstrom units. A source of electric energy, which may be a plurality of dry cells 12 connected in series, has the end negative pole thereof connected to the cathode 11 by conductor 13 and has the end positive pole thereof connected to a movable switch contact 14 by conductor 15.

A stationary contact 16 of said switch is connected to one side of a condenser 17 by conductor 18 and the other side of condenser 17 is connected to the anode 10 by conductor 19. A high resistance 20 has one end thereof connected to conductor 19 and its other end connected to a resistance 21 by conductor 22. The resistance of element 20 may be about $10^8$ ohms. The other end of resistance 21 is connected to a movable switch contact 23. A stationary contact 24 of said switch is connected to the end negative pole of a plurality of dry cells 25 in series as shown by conductor 26. The end positive pole of said dry cells 25 is connected to conductor 22 by conductor 27. A movable contact 28 has its stationary end connected to conductor 18 and its free or movable end 29 may be moved along the resistance 21 and therewith comprises a potentiometer. A three electrode vacuum tube including an anode 30, cathode 31 and grid 32 has its grid 32 connected to conductor 19 by conductor 33. One side of cathode 31 is connected to the stationary switch contact 34 and its other end connected to the end positive pole of a plurality of dry cells 35 in series. A conductor 36 connects the end negative pole of dry cells 35 to a movable contact 37 of said switch. A standard dry cell 38 of 1.5 v. has its negative pole connected to the conductor 18 by conductor 39 and its positive pole connected to the end negative pole of dry cells 35 by conductor 40. A milliammeter 41 has one end connected to anode 30 by conductor 42 and its other end connected to the end positive pole of dry cells 43 in series by conductor 44.

The source of electric energy at 43 may have a voltage of 22.5 v. A variable resistance 45 has one end thereof connected to the end negative pole of the dry cells 43 by conductor 46 and its other end is connected to the positive pole of a standard cell 47 by conductor 48 and the negative pole of cell 47 is connected to conductor 40 by conductor 49. Connected by conductor 50 to conductor 46 is the stationary contact 51 of a switch whose movable contact 52 is connected to one end of a resistance 53 by conductor 54. The other end of resistance 53 is connected by conductor 55 to a movable contact 56 of a switch whose stationary contact 57 is connected by conductor 58 to a contact 59 of another switch. The contact 59 is connected to conductor 46 by conductor 60. A contact 61 is located below contact 59 and is connected to one end of a resistance 62 by conductor 63. The other end of resistance 62 is connected to conductor 54 by conductor 64. A galvanometer 65 has one terminal connected to conductor 64 by conductor 66. A contact 67 is connected to member 65 by conductor 68 and the other terminal of galvanometer 65 is connected to conductor 68 by conductor 69. A movable T switch contact 70 has one end permanently connected to contact 67 and the cross bar thereof is normally located above and out of contact with contacts 59 and 61.

Located in front of the photoelectric cell is a source of light 90 and for this purpose, I prefer to employ a well known zinc vapor lamp, which produces six strong lines between 3282 Angstrom units and 3346 Angstrom units, some lines at and below 3076 Angstrom units and some strong lines above 4000 Angstrom units.

Since the photocell is not sensitive to those lines above 5000 Angstrom units in the visible spectrum, I employ a filter 91 which is located between the source of light 90 and the photocell in order to absorb the 3076 line and any therebelow as well as those in the visible portion of the spectrum to which the cell is sensitive, but allows the passing therethrough of the six strong lines between 3282 and 3346 Angstrom units. For this purpose I employ a filter 91, known on the market as "Corning filter #597." Between the filter 91 and the source of light 90 may be located the cell 93 and between the cell 93 and source of light 90 may be located a shutter 94 adapted to be opened and closed by rod 95 having one end secured to movable switch contact 23.

The following is an explanation of the functioning of the parts and the operation of the circuit as shown and described. Contact 37 may be moved to closed position on contact 34 to complete the heating circuit for cathode 31 so that cathode 31 may be in electron emissive condition, and contact 14 may be moved to closed position on contact 16 to complete the main photoelectric circuit. With this condition existing and the other switches open as shown, the grid 32 is 1.5 v. more negative than the cathode 31 due to the 1.5 v. cell 38 and the photoelectric cell is not energized. At this stage it will be noted that the ammeter reading may be .100 ma.

The cell 93 is removed from between the filter 91 and shutter 94. The zinc vapor lamp 90 is energized by a suitable source of E. M. F. and movable contact 23 is actuated to closed position on contact 24 and simultaneously to actuate rod 95 whereupon shutter 94 is opened.

The switch contact 52 is moved to closed position on contact 51. The light from the lamp 90 strikes cathode 11 and energizes the same, whereupon there is an IR drop across the high resistance 20 and an IR drop across the resistance 21. The IR drop across the resistance 21 is negligible because resistance 21 is of the order of 100 ohms, when compared with the IR drop across resistance 20. The IR drop across resistance 20 tends to make the grid more negative, but the IR drop across 21 due to 23 being closed tends to make the grid more positive and the ultimate potential relationship between grid 32 and cathode 31 will be reflected in the reading of ammeter 41 which is now observed. Ordinarily this reading will be at variance with the first noted reading of .100 ma. The positions of the movable end 29 of conductor 28 along the resistance 21 may be varied until the IR drop across the resistance 20 and the IR drop of the resistance 21 from its upper limit to the end 29 is equal and opposite so that the grid 32 is exactly 1.5 v. negative to the cathode and the ammeter reads as before .100 ma.

Since the vapor lamp 90 is energized by an alternating current source of electric energy, the condenser 17 is employed. Of course, if the lamp were energized by a direct current source of electric energy, no condenser would be required.

It is preferred to employ a variable resistance 45 of about 25,000 ohms maximum. With the plate current flowing the potential at the upper end of resistance 45 will be more negative than at the lowermost end thereof and the amount depends upon the value of resistance 45.

The potential of the conductor 49 just below the negative pole of battery 47 is more negative than the lowermost part of resistance 45 by virtue of battery 47 and the variable resistance is adjusted so that the IR drop through resistance 45 is equal to the potential of battery 47 and under this condition a galvanometer thereacross will read 0.

In order to protect the galvanometer 65, the resistance 62 is employed. Since the resistance of galvanometer 65 is about 1000 ohms, it is preferred that the rough adjustment resistance 62 be about 50 ohms and the critical damping resistance 53 may be 1000 ohms. In operation after the resistance 45 has been varied the T contact 70 is pressed down to connect contacts 59, 61 and 67 to each other whereupon most of the current passes through shunt resistance 62 and the galvanometer deflection is noted whereupon the resistance 45 is varied until the galvanometer reads 0. Then the contact 70 is released to disconnect contacts 59, 61 and 67 from each other and contact 56 is closed down on contact 57 and the galvanometer deflection is again noted and the resistance 45 is further varied until the galvanometer now reads 0.

Assuming that the parts described are arranged as set forth herein and shown in the drawing, the concentration of a vitamin A solution or the like may be measured rapidly and exactly by an unskilled operator in the following simple manner. The cell 93 now contains only solvent therein, the shutter 94 is in closed position and the lamp 90 is energized, switch contacts 14, 37 and 52 are actuated to closed positions. After about 5 minutes, contact 70 is actuated to closed position and the variable resistance 45 is varied until galvanometer 65 reads 0 whereupon contact 70 is released and contact 56 is actuated to closed position and if the galvanometer does not read 0, resistance 45 is further varied until it does and releases contact 56.

Then actuate switch contact 23 to closed position whereupon rod 95 is actuated to open shutter 94. Actuate contact 70 to closed position and then adjust resistance 21 by moving contact 29 until galvanometer reads 0. Release contact 70 and actuate contact 56 to closed position and if galvanometer 65 does not now read 0, again move contact 29 until galvanometer 65 does read 0, after which the contact 56 is released, switch 23 is moved to open position and shutter 94 is thereby closed and the potentiometer reading at 21 is taken and noted as $P_1$.

The solvent is replaced with a solution of substance whose concentration is to be measured. The cell containing this solution is placed in the same position as was that cell containing only the solvent. The galvanometer circuit is balanced as before by moving contact 70 to closed position by varying resistance 45 until the galvanometer reads 0, releasing contact 70 and actuating contact 56 to closed position and if necessary, varying resistance 45 until galvanometer reads 0 and releasing contact 56.

Switch contact 23 is actuated to move contact 23 to closed position and simultaneously to open shutter 94. The light from lamp 90 passes successively through shutter 94, cell 93 plus the solution therein and filter to the cathode 11 of the photoelectric cell. The contact 70 is moved to closed position and the contact 29 is moved along resistance 21 until the galvanometer reads 0. Then contact 70 is released and contact 56 is moved to closed position and, if necessary, contact 29 is moved further along resistance 21 until the galvanometer again reads 0 and contact 56 is now released. The potentiometer reading at 21 is now taken and noted as $P_2$.

All closed switches may now be opened until it is time for the next sample to be tested.

Since the potentiometer readings $P_1$ and $P_2$ are directly proportional to the photocell current, which is in turn proportional to the light affecting the photocell, from these two readings may be readily calculated the E value in the customary manner.

Although the invention has been described with minute particularity, it is not to be limited thereby, because various changes may be made within the scope of the invention.

What is claimed:

1. Apparatus for measuring the concentration of vitamin A in a substance comprising a zinc vapor source of light, photoelectric means upon which the light from said source is directed, said photoelectric means being substantially insensitive to those lines above 5000 Angstrom units in the visible spectrum, a filter located between said source of light and said photoelectric means, said filter adapted to absorb substantially all radiation except those between 3282 and 3346 Angstrom units, to which said means is sensitive, means for interposing a sample of substance to be measured between said source of light and said photoelectric means and means connected to said photoelectric means for indicating the degree of change in photoelectric current.

2. Apparatus for measuring the concentration of vitamin A in a substance comprising a zinc vapor source of light, a circuit comprising a photoelectric cell including an anode and cathode, said cathode composed of sodium, a source of electric energy, a high resistance and potentiometer, a second circuit including a source of electric energy, and a three electrode vacuum tube including anode, cathode and grid, and means for indicating the plate current at said anode, said grid connected to said first circuit.

3. Apparatus for measuring the concentration of vitamin A in a substance comprising a zinc vapor source of light, a photoelectric cell including an anode and a sodium surface cathode, said cell located in the path of light from said source of light, a filter adapted to absorb all radiation from said source to which said cathode is sensitive except those between 3282 and 3346 Angstrom units, means for interposing between said filter and source of light a sample of substance to be measured and a shutter adapted to be opened and closed, said shutter located between said source of light and said means.

4. Apparatus for measuring the concentration of vitamin A in a substance comprising a zinc vapor source of light, a photoelectric cell including an anode and a sodium surface cathode, said cell located in the path of light from said source, a filter adapted to absorb the light from said source below 3076 Angstrom units, said filter interposed between said source of light and said cell, means for interposing between said filter and source of light a sample of substance to be measured, a circuit including a source of electric energy, said cell, a high resistor and a potentiometer, a three electrode amplifying tube, the grid of said tube connected to the anode of said cell, the cathode of said tube connected to said potentiometer and means connected to the anode of said tube for indicating the plate current.

BEAUMONT DEMAREST.